United States Patent [19]

Miraglia, Jr.

[11] Patent Number: 4,867,425
[45] Date of Patent: Sep. 19, 1989

[54] PORTABLE GUIDE FENCE FOR HAND HELD POWER SAWS

[76] Inventor: Humbert G. Miraglia, Jr., 1409 North St., Corning, Calif. 96021

[21] Appl. No.: 331,862

[22] Filed: Apr. 3, 1989

[51] Int. Cl.$^4$ .............................................. B27B 9/04
[52] U.S. Cl. .......................................... 269/1; 30/372; 83/745
[58] Field of Search ................. 83/745, 743, 761, 486, 83/455, 456; 30/80, 371, 372, 373; 269/1

[56] References Cited

U.S. PATENT DOCUMENTS

| | | | |
|---|---|---|---|
| 3,871,103 | 3/1975 | Simmons | 83/745 |
| 3,913,440 | 10/1975 | Baker | 83/745 |
| 4,112,987 | 9/1978 | Pachnik | 83/745 |
| 4,524,662 | 6/1985 | Carley | 83/745 |
| 4,736,523 | 4/1988 | Hanning | 83/745 |

*Primary Examiner*—Frank T. Yost
*Assistant Examiner*—Scott A. Smith

[57] ABSTRACT

A one-piece elongated rectangular metal fence plate adjustably attachable to a cutable guide base of plywood or plastic. One longitudinal edge of the fence plate is formed into a guide fence for hand held power circular saws or saber saws. The invention has straight widened edges of adjustably bolting to the surface of the guide base. The fence plate attached to the guide base provides an elongated saw guide fence for straight cutting of large building material panels such as plywood. The guide base is a rectangular panel sized equal in length to the fence plate. The guide base is initially of greater width than the width of the fence plate plus the width of the base of the power saw. For the initial set-up, the fence plate is bolted to the guide base. The guide base is then cut to size using a power hand saw with the guide fence of the attached fence plate serving as the saw guide to assure parallel alignment of the guide fence relative to the cut edge of the guide base. After cutting the guide base to width, the device is preset and ready to use for that particular hand held power saw and blade so that the added dimensions of the width of the saw base and the blade kerf are not required to be computed into each guided cut of a piece of building material.

6 Claims, 6 Drawing Sheets

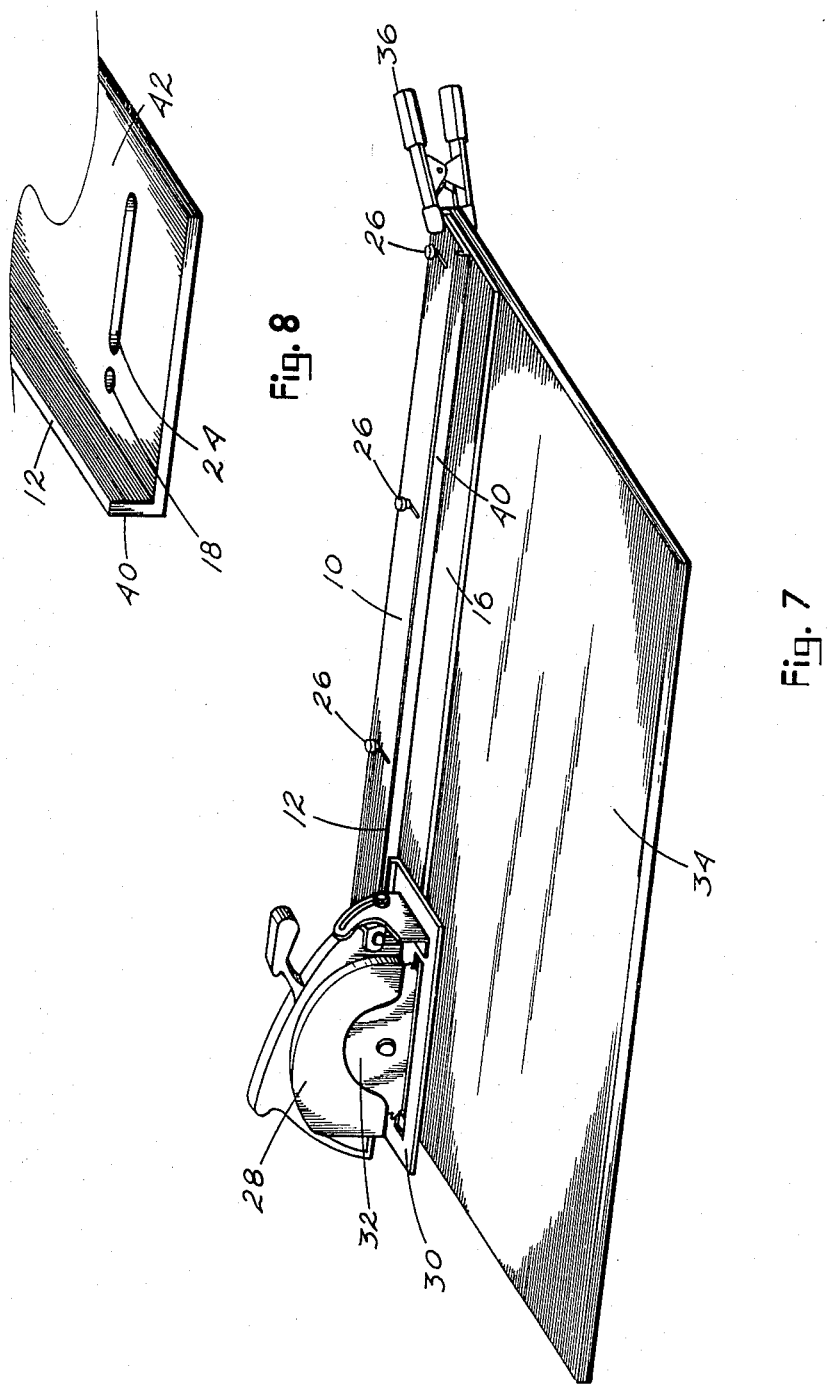

PORTABLE GUIDE FENCE FOR HAND HELD POWER SAWS

BACKGROUND OF THE INVENTION

1. Field of the Invention

This invention relates to woodworking power tool accessories in general and, more precisely, the present invention is an adjustable fence guide designed primarily for use with circular power saws for cutting large flat panels such as plywood.

2. Description of the Prior Art

Fence guides are well known in the field of woodworking for keeping the edge of the wood being sawn parallel with the cutting blade in order to produce a perfectly straight cut. Most typically non-portable woodworking equipment including table saws and some band saws come equipped with adjustable guide fences primarily designed for this purpose. Hand held portable electric saws however are not furnished with inherent means for producing straight cuts since they are generally used for non-critical applications where complete accuracy is not essential such as the framing stage of building construction. Hand held saws, such as electrically powered circular saws and saber or jig saws, are not only useful in that they are portable and can be transported easily, but they can also create cuts which would be difficult or impossible to do on a conventional table saw. One such procedure which is extremely difficult to do with a table saw is rip a section of plywood. Due to the large size of the plywood, generally 4 X 8 foot panels, and the limited width adjustment range of the table saw fence guide, hand held circular saws are often used to free hand cut the plywood following only a penciled line. Although fence guide attachments for power circular hand saws are available, generally, they are adjustable arms affixed to the base of the saw with a lip or guide on the opposite end for engagement with the edge of the plywood. This type of device works only if the edge of the plywood is straight, otherwise, inperfections on the edge are reflected in the cut. Many times a board or plank the length of the plywood is merely clamped onto the surface of the plywood with the edge being used as a guide fence for the circular hand saw. Using this technique, however, additional time consuming measurements must be taken to allow for the width of the circular saw base and blade which extend beyond the edge of the board being used as a guide fence.

A search conducted at the U.S. Patent Office in the classes and subclasses 83/455, 565, 567, 745, 749, and 821 did not reveal a device relatively similar to the operational structure of my guide fence. Most disclosures showed upper and lower clamp plate arrangements or lateral guide rods on which a power saw or a router rides. Although patent number 4,307,513 issued to Genge, Dec. 29, 1981, uses an edge guide, the supporting surface is quite large and cumbersome and the clamping mechanism is somewhat complicated. Other patents examined are included herewith for reference purposes.

Having seen nothing in the prior art or in the marketplace comparable to the simplicity and usefulness of my device, I therefore have concluded that may guide fence is a better concept. As my simple device provides new and useful improvements over existing portable guide fences by helping to reduce set-up time and by providing means to produce a truly straight cut, the invention appears unique to the field.

SUMMARY OF THE INVENTION

In practicing my invention I have developed a portable guide fence for hand held power saws which, after the initial set-up of the device, can be used without further adjustments or measurements, except for the measurement of the dimensions of the board to be cut. The invention is comprised of a fence plate which is an elongated substantially rectangular bar. The bar is formed with various edge configurations according to use and is primarily an elongated flat metal plate. The flat metal plate or bar is hereinafter referred to as the fence plate. The fence plate is removably and adjustably affixed to a flat surface of a section of plywood equal in length to the length of the fence plate. This adjoining section of plywood, hereinafter referred to as the guide base, is approximately seven inches wide while the fence plate is approximately two and a half inches in width. These dimensions are not critical and can change according to use requirements. The fence plate can be a single piece flattened strip so long as one longitudinal edge is thick enough to act as a guide fence for the base plate of an electrically powered hand saw. In a preferred embodiment, the fence plate, positioned wide sides horizontally, has two oppositely extending perpendicular flanged edges, one arranged to extend upwardly on one lengthwise edge and the other extending downwardly on the opposite lengthwise edge. The upwardly extending flanged edge of the fence plate serves as the guide fence to which the edge of the circular saw base abuts. The opposite downward flange hangs downward over one longitudinal side edge of the guide base and primarily serves as a straight edge for other cutting and marking proceduces, however the downward flange is initially used to align the fence plate on the guide base. To set-up the device for use, the fence plate, used as a template, is inverted and using a hand drill and the alignment holes provided adjacent the guide fence side of the fence plate, an alignment of apertures is drilled along one side of the guide base. these drilled apertures are sized to accept thumbscrew bolts pushed upwardly from the bottom of the guide base. To provide a smooth undersurface on the guide base, the heads of the thumbscrew bolts are countersunk into the undersurface of the guide base using conventional means. The fence plate is then turned back over so the guide fence flange faces the wide surface of the guide base and the downward flanged side of the fence plate abuts the longitudinal edge of the plywood guide base. The threaded ends of the thumbscrew bolts extend upwardly through the apertures and through adjustment slots cut transversely through the fence plate. Thumbscrew knobs are turned down on the threaded ends of the thumbscrew bolts. The widened bases on the thumbscrew knobs tighten down on the surface of the fence plate affixing the fence plate firmly to the guide base. So long as the length of the plywood to be used as a guide base is the same length as the fence plate, the width is immaterial as long as the power saw abutted to the fence plate is capable of cutting the guide base material to the proper width. The method of initially cutting the guide base to the proper width with the base plate of the power saw hand held firmly against the guide fence assures a nearly perfect parallel alignment between the guide fence and the cut edge of the guide base. This method of initially cutting the guide base to width also automatically positions the edge of the saw blade as close as is reasonably possible to the cut edge of the guide base.

After the guide base has been initially cut to size, the portable guide fence is ready to use. When a different saw blade is installed on the saw, it is necessary to make adjustments to compensate for the normally slightly different thicknesses between the initial blade and the second blade. To make the necessary adjustments for the new blade, the thumbscrew knobs are loosened and the fence plate slid away from the cut edge of the guide base utilizing a portion of the length of the adjustment slots. The thumbscrews are then tightened. The guide base is then cut again using the blade on the saw which is going to be used. The length of the adjustment slots allow repeating of this process quite a few times before a new guide base is needed.

In use, the assembled unit is clamped to the surface of the panel of plywood to be cut, aligning the outer or cut edge of the plywood guide base with a marked line on the plywood. The saw guide device must be placed on the section of the plywood which is to be saved, not the waste section, or else the cut will be off the width of the saw blade. The cut is then made with the bottom surface of the base plate of the circular saw resting on the top surface of the guide base plate and keeping the left edge of the base plate of the circular saw flush against the guide fence of the fence plate. Repeated accurate cuts on various sections of plywood or other suitable material can be made with the device using the same circular saw without realignment of the device. My portable guide fence is aligned for accurately cutting a sheet of plywood simply by abutting the guide base against a measured and marked line on a panel of plywood. The only measurement required for successive cuts in the measurement of the board to be cut. My device also saves set-up time by providing a template for drilling the guide base useful each time a new guide base is needed.

Therefore, a primary object of my invention is to provide a portable guide fence for cutting large wooden panels such as plywood.

Another object of my invention is to provide a portable guide fence which eliminates the need to calculate the blade kerf and the width of the circular saw base between the blade and the built in edge guide of the base in order to correctly position the portable guide fence.

A further object of may invention is to provide a portable guide fence which can be adjusted for use with different portable power hand saws.

An even further object of the invention is to provide a portable guide fence which allows quick and easy installation or replacement of the guide base by providing a drilling template.

A still further object of the invention is to provide a portable guide fence for hand held power saws which uses an inexpensive and readily available material for the guide base of the invention.

Other objects and the many advantages of my device will become apparent by reading descriptions of numbered parts in the following specification with reference to the same numbered parts illustrated in the drawings.

BRIEF DESCRIPTION OF THE DRAWINGS

FIG. 7 is an assembled in-use illustration of the invention clamped to the surface of a section of plywood and serving as a rip fence for a circular hand saw.

FIG. 8 is a partial perspective view of a second embodiment of the invention which has only one flanged edge.

Figure 1:
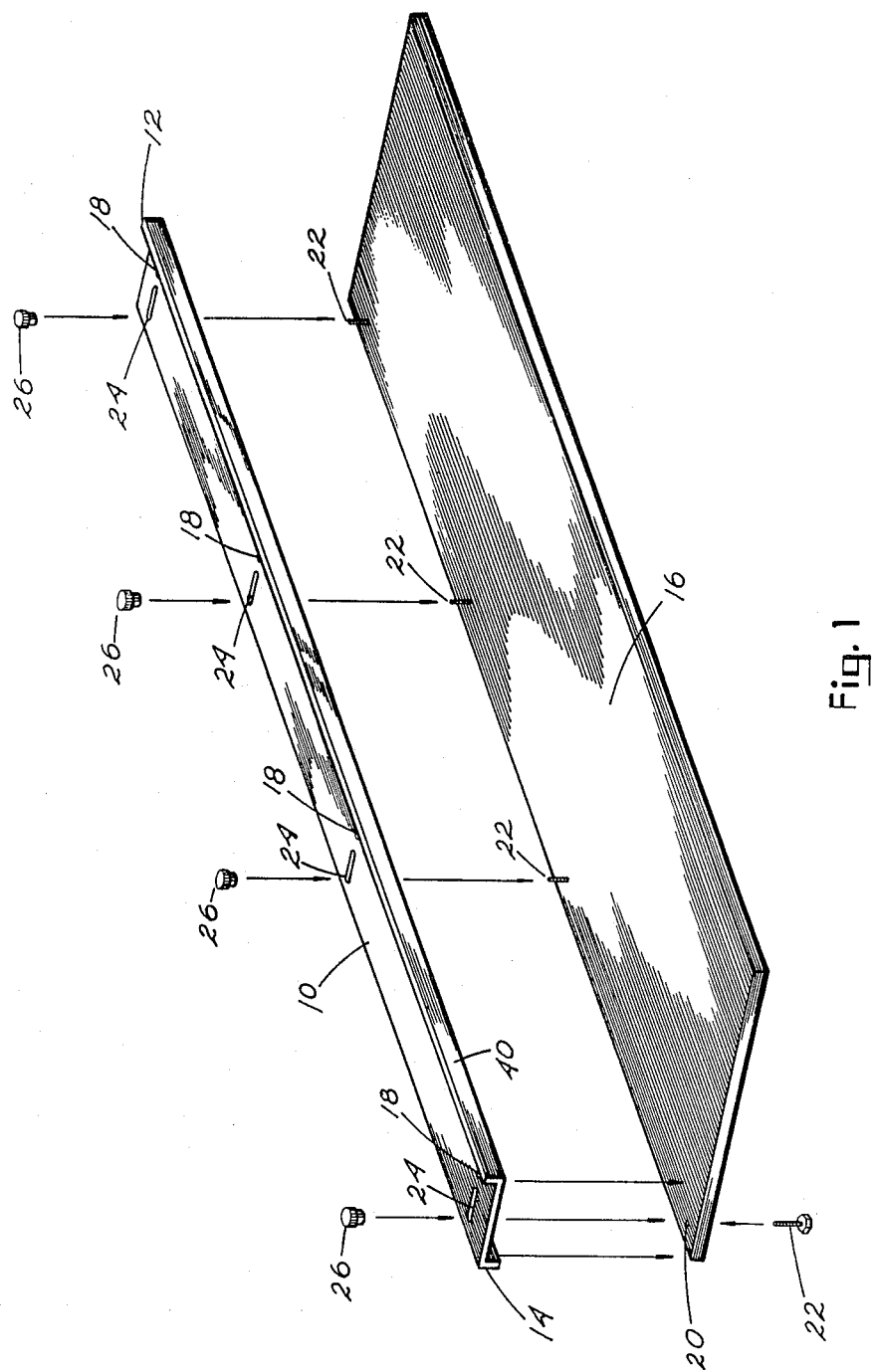
FIG. 1 is a perspective exploded view of the invention illustrating the top fence plate positioned over the bottom guide base.

DRAWING REFERENCE NUMBERS 10 fence plate
12 upward flanged edge
14 downward flanged edge
16 guide base
18 drilling apertures
20 bolt apertures
22 thumbscrew bolts
24 adjustment slots
26 thumbscrew knobs
28 circular hand saw
30 base plate
32 blade
34 plywood
36 clamps
38 hand drill
40 guide fence
42 single flange embodiment
44 no flange embodiment

DESCRIPTION OF THE PREFERRED EMBODIMENT

Figure 4:
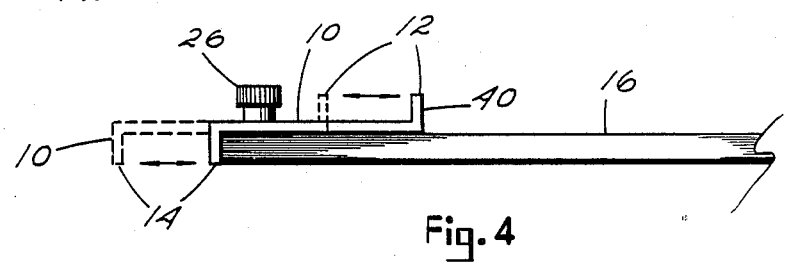
FIG. 4 is an assembled partial end view of the invention illustrating adjustment range of the fence plate.
Figure 5:
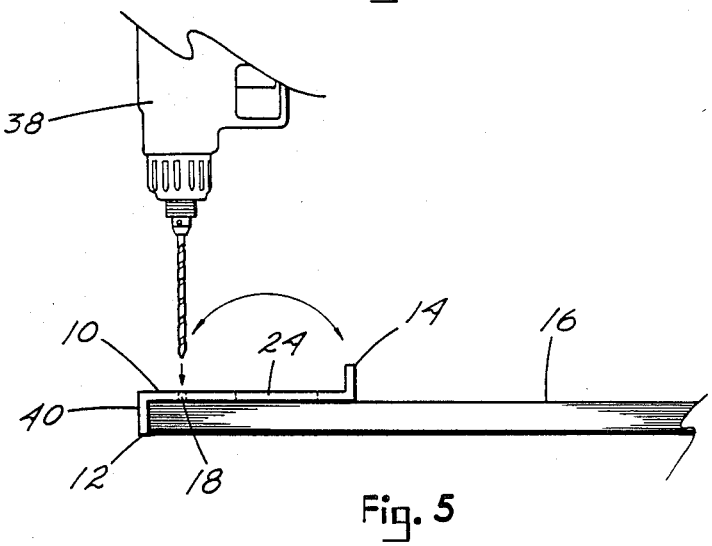
FIG. 5 is a partial end view showing the fence plate flipped over and serving as a template for the drilling of the bolt apertures, which is necessary if the metal fence plate is sold separately and the buyer furnishes the guide base.
Figure 6:
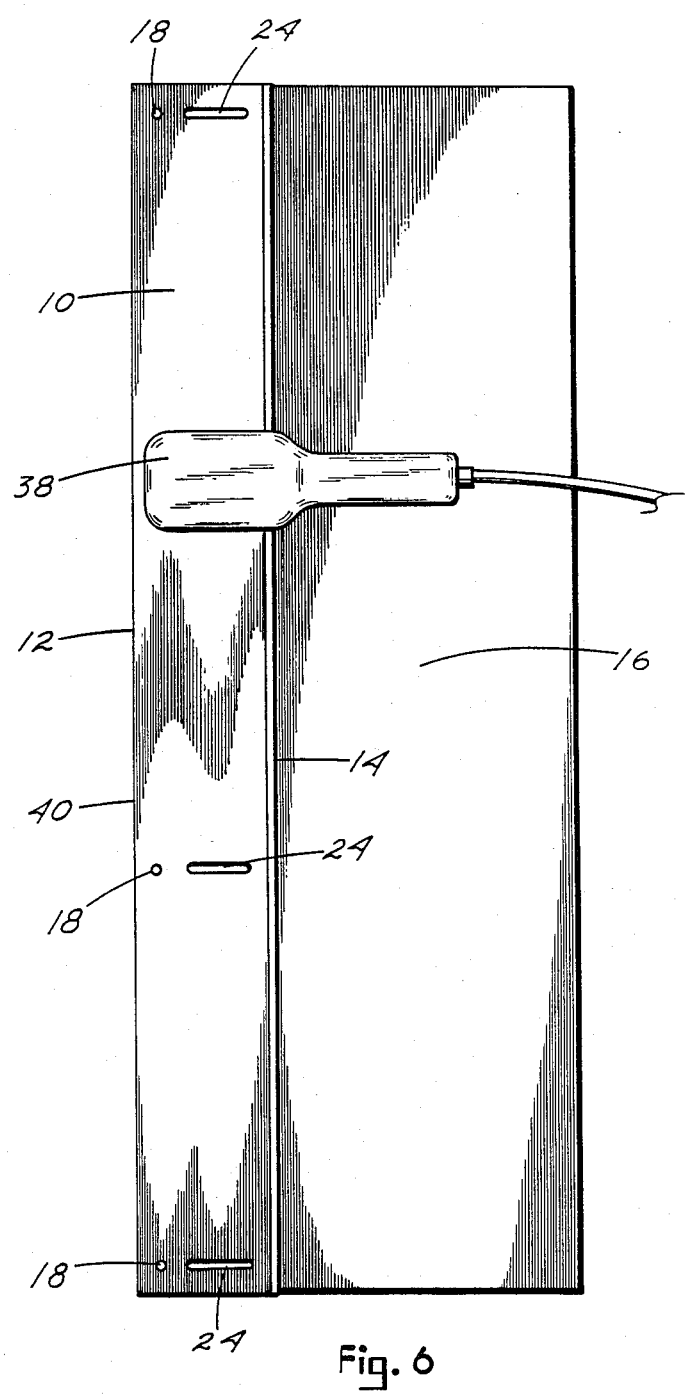
FIG. 6 is a top view of the invention as shown in FIG. 5, with the fence plate being used as template for aligning bolt apertures shown being drilled by an electric hand drill.
Figure 9:
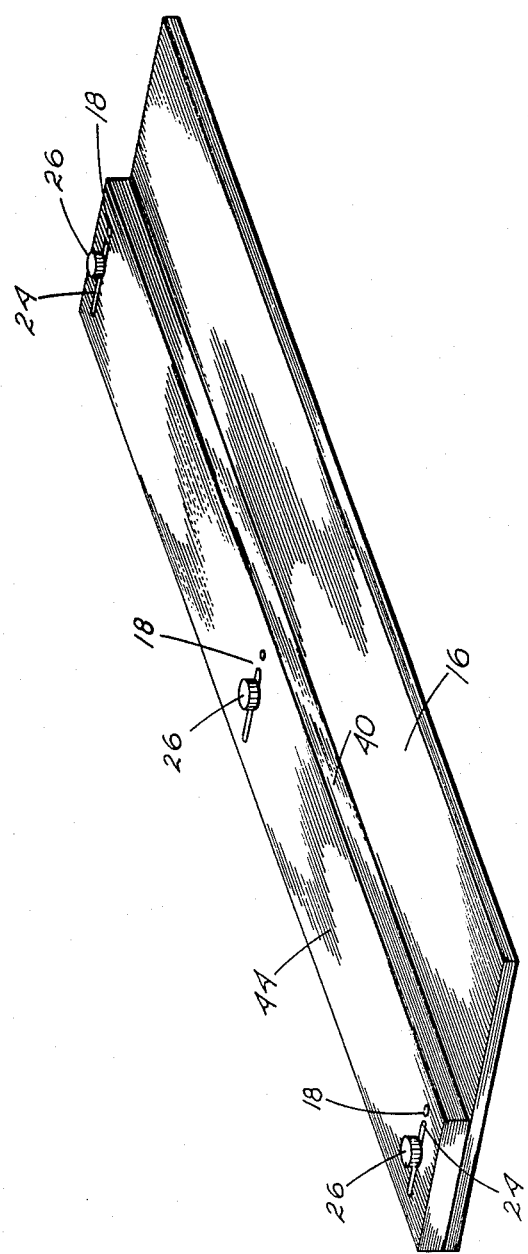
FIG. 9 is a perspective view of the invention showing an embodiment having a thickened fence plate with no flanged edges illustrating use of the thickened side wall as a fence guide for a circular hand saw.

Referring now to the drawings and to FIG. 1 where the invention is shown in an exploded perspective view. The invention is comprised of fence plate 10 which is an elongated substantially rectangular bar in the form of a flat metal plate. Fence plate 10, in the FIG. 1 embodiment when horizontally disposed as illustrated, has one upwardly right angled lengthwise flanged edge designated upward flanged edge 12 and one downwardly right angled lengthwise flanged edge designated downward flanged edge 14. The flanged edges project as edging lips approximately one-forth to one-half inches upwardly and downwardly along the lengthwise edges of fence plate 10. The bar form of fence plate 10 with flanged edges provides fence plate 10 in a simple one-piece structure. Although fence plate 10 can conceivably be provided in any useful length, width, or thickness, the preferred lengths are four and eight foot sections, the preferred widths range from approximately one and a half inches to four inches, and the thickness depending on use being one eight inch to one quarter inch thick. It is noted that in an embodiment of fence plate 10 having one flanged edge, single flange embodiment 42, FIG. 8, or no flanged edges as illustrated in FIG. 9, no flange embodiment 44, the plate width would be formed in a manner to provide a sufficiently widened longitudinal edge to act as a guide fence 40 for the base plate 30 of circular hand saw 28. Fence plate 10 is designed to be adjustably affixed to the top left hand surface of guide base 16, illustrated by the dotted outline in FIG. 2 and 4. Guide base 16 is an elongated rectangular flat panel manufactured of plastic wood, preferably ¼ inch plywood, sized approximately four to six times the width of fence plate 10 and equal in length to the length of fence plate 10. When plywood is used for guide base 16, the length of the plywood used must be equal in length to fence plate 10. The width of the plywood used in immaterial as guide base 16 is cut to the proper width using the attached fence plate 10 and trimming the plywood by cutting with circular hand saw 28 with base plate 30 abutted guide fence 40 after attachment of fence plate 10 to the plywood. For attachment of fence plate 10 to plywood used for guide base 16, a series of round drilling apertures 18 are positioned on fence plate 10 adjacent lengthwise upward flanged edge 12 approximately four for a four foot fence plate 10 and approximately eight for an eight foot fence plate 10. Driling apertures 18 are used as a template for the drilling of bolt apertures 20 located adjacent the left lengthwise edge of guide base 16. When used as a template, fence plate 10 is temporarily inverted, see FIGS. 5 and 6. This procedure is necessary when the device is provided without the guide base 16 and the user must make his own. The drilling of bolt apertures 20 is illustrated in FIG. 5 and 6. Bolt apertures 20 are countersunk on the bottom surface of guide base 16 to allow the head of thumbscrew bolts 22 to lie flush. After drilling and for attachment, fence plate 10 is turned back over. A series of elongated grooves, designated adjustment slots 24, are centrally transversely located between drilling apertures 18 and downward flanged edge 14 on fence plate 10. To assemble the parts, fence plate 10 is positioned on the left hand surface of the plywood guide base 16 with downward flanged edge 14 overhanging the left edge as an alignment guide aligning adjustment slots 24 with bolt apertures 20. Thumbscrew bolts 22 are inserted through the bottom of bolt apertures 20 of guide base 16 and extended up through adjustment slots 24 of fence plate 10. Thumbscrew knobs 26 are threaded over the screw end of thumbscrew bolts 22 and tightened to secure fence plate 10 in position on guide base 16.

To correctly align fence plate 10 on guide base 16 for use with circular hand saw 28, guide base 16 is initially cut by circular hand saw 28. Most circular hand saws 28 have a pivotal base plate 30 which rests on the surface of the wood which is being cut. The left side edge of base plate 30 is generally upturned to provide a guide face, for abutment to some form of straight edge such as guide fence 40 on fence plate 10. Guide fence 40 may also be the outer longitudinal edge surface of a single flange embodiment 42 or of a no flange embodiment 44, illustrated in FIG. 8 and FIG. 9 respectively. Base plate 30 of circular hand saw 28 extends outward horizontally a short distance beyond either side of blade 32 of circular hand saw 28. Guide fence 40 which is the outer edge of upward flanged edge 12 is the support surface for the left side of base plate 30 of circular hand saw 28 for the first initial set-up cut. This initial cut assures nearly perfect parallel alignment of guide fence 40 and the right side edge of guide base 16. It also positions the left side of blade 32 as near the right side edge of guide base 15 as is possible.

Figure 2:
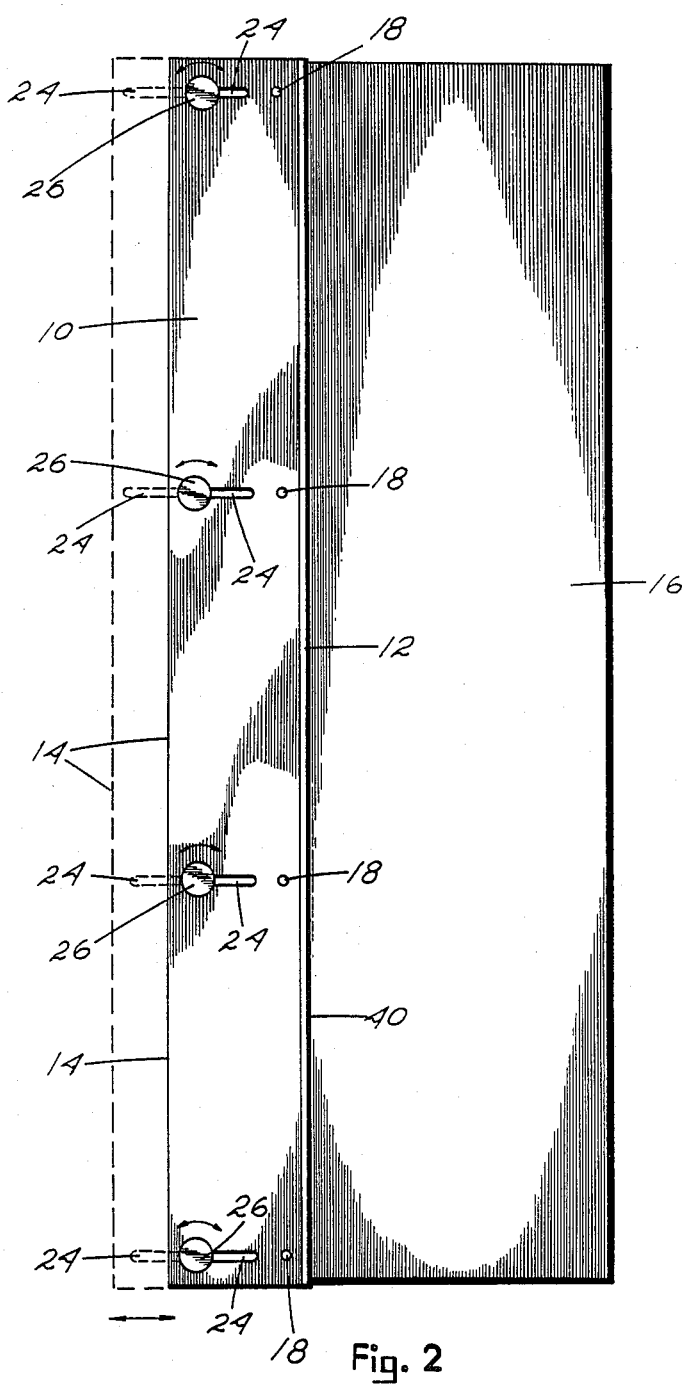
FIG. 2 is a top plan view of the assembled invention showing the range of adjustability of the fence plate.

Since power saw bases vary in width, and saw blades vary in width from one blade to another, it is necessary to make adjustments to the distance between guide fence 40 and the right side edge of guide base 16 if a different saw 28 or saw blade 32 is used from that which was initially used to cut guide base 16. To make such necessary adjustments, thumbscrew knobs 26 are loosened and fence plate 10 is slid away from the right side edge of guide base 16 a sufficient distance to allow another cutting of guide base 16 with the new saw 28 or blade 32. The adjustability of fence plate 10 in relationship to guide base 16 is shown in FIG. 2 and in FIG. 4. Thumbscrew knobs 26 are then tightened down on thumbscrew bolts 22 to secure fence plate 10 in position and a new cut is made to guide base 16 using the saw 28 and blade 32 which is going to be used for making straight cuts through building materials.

Figure 3:
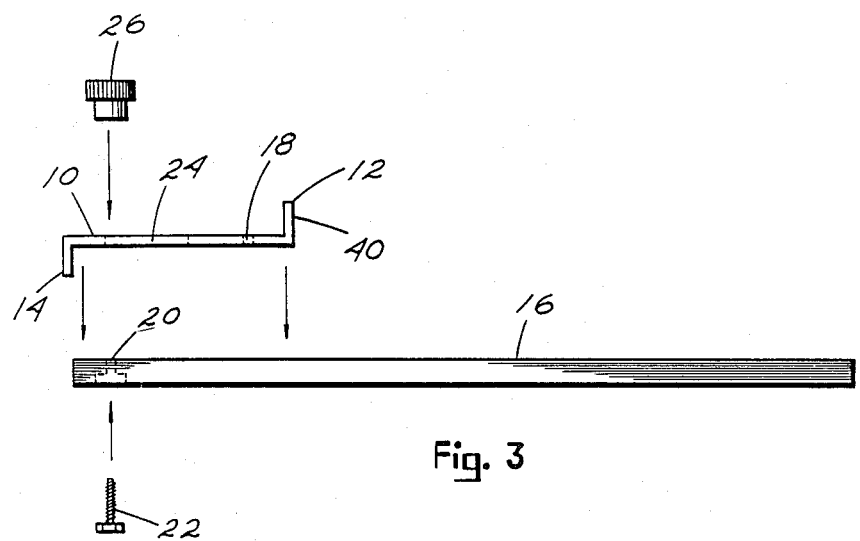
FIG. 3 is an exploded end view of the invention with the fence plate positioned for attachment by thumbscrews to the guide base.

Although only a small amount of guide base 16 is cut off each time the invention is initially set-up for a particular saw 28 or blade 32, eventually a new guide base 16 will be needed. This may occur as often as once a month with a very busy carpenter. To replace guide base 16, thumbscrew knobs 26 are completely unscrewed from thumbscrew bolts 22 and fence plate 10 removed from guide base 16 as illustrated in FIG. 1 and FIG. 3. The provided template of the invention using drilling apertures 18 makes replacement of guide base 16 exceptionally uncomplicated.

In use, as illustrated in FIG. 7, the panel of plywood 34 which is to be cut is marked with a guide line designating where the cut is to be made. Either one long mark is used from edge to edge on the surface of plywood 34 or two small marks on either edge are used. The right edge of guide base 16 is aligned on th mark on plywood 34, being sure to place guide base 16 on the section of plywood 34 which is to be saved. If guide base 16 is inadvertently placed on the section of waste plywood 34 with the right edge abutting the marked line, the kerf of blade 32 will not be correctly calculated into the cut and the piece of panel to be saved will be slightly short, a distance of which is equal to the kerf of blade 32. To secure the device on the surface of plywood 34, spring biased clamps 36 are placed on each left hand corner over fence plate 10 and plywood 34. Circular hand saw 28 is then positioned with the left edge of base plate 30 abutted against upward flanged edge 12 or guide fence 40 and the cut made. Blade 32 will run parallel to the edge of guide base 16, and should it for some reason cut into guide base 16, blade 32 will not be damaged. For this reason, it is important for guide base 16 to be wood or some material that will not damage the cutting blades 32.

The embodiment of fence plate 10 having both upward flanged edge 12 and downward flanged edge 14 is also useful as a straight edge. Carpenters and other craftsman regularly use straight edges for making lines or guiding a knife blade in order to score or cut a piece of building material. Downward flanged edge 14 is the straight edge. If downward flanged edge extends downward ¼ inch, then fence plate 10 would be mounted on a guide base 16 which is also ¼ inches thick to allow flanged edge 14 to be positioned close to the building material. This is important for use as a straight edge. A flange 14 extending downward ½ inch would require mounting fence plate 10 on a guide base 16 at least ½ inch thick.

Although fence plate 10 can be provided attached in combination with guide base 16 for sale to the public, fence plate 10 is primarily designed to be sold as a separate unit. When sold separately, directions will be provided for the user to buy a section of ¼ or ½ inch plywood 34 and cut it to the correct size of guide base 16. Most carpenters however usually have suitable plywood scraps in their shop since guide base 16 is narrow. To properly drill aligned bolt apertures 20 in the user's guide base 16, fence plate 10 is inverted or flipped over and positioned so that upward flanged edge 12 is flush against the left hand edge of guide base 16. Drilling apertures 18 are now adjacent the left hand lengthwise edge of guide base 16, as shown in FIG. 5 and 6. Using hand drill 38, or other drilling means, bolt apertures 20 are drilled through guide base 16 producing holes the same diameter as drilling apertures 18. The bottom surface of bolt apertures 20 are widen in order to countersink the heads of thumbscrew bolts 22. When re-inverted into the normal use position with upward flanged edge 12 positioned on the right, drilling apertures 18 in guide base 16 are now aligned with the left edge of adjustment slots 24 of fence plate 10 when fence plate 10 is positioned to the far right or toward the edge of guide base 16 which is to be cut. Guide base 16 is then cut to size as described above.

My invention eliminates the excess set-up time that is usually required when conventional guides are used to cut large panels such as plywood 34. When many of these devices are used, the additional width of base plate 30 of the circular hand saw 28 and of blade 32 must be taken into consideration to properly align those types of guides. With my device, the only measurement to be marked is the size of the panel to be cut. My device also provides a drilling template which makes it much easier to use than other similar past art saw guides. My invention can also be used with other power hand tools such as saber saws and routers.

Although I have mentioned specific dimensions and materials of manufacture in describing my invention in the specification, and I have illustrated certain elements of design in the drawings, it is to be understood all such references are merely descriptive of the intent of my invention. They are not meant to limit the concept or scope of the invention, which is restricted only by the range of the appending claims.

What I claim as my invention is:

1. A portable guide fence for hand held power saws, comprising:
    a fence plate;
    said fence plate being an elongated substantially rectangular bar;
    said bar formed into a sideways Z-structure by aligned flanges oppositely disposed vertically, one along each longitudinal edge of said bar with said flanges generally equally sized and in parallel alignment;
    said bar with said flanges providing one-piece structuring of said fence plate, there being a wide section having a top surface and a bottom surface with said flanged edges forming an upwardly disposed guide fence for said hand held power saw and a downwardly disposed edge alignment guide;
    said fence plate invertible as a template with said top surface downward and said guide fence in alignment with an edge of a guide base to position an alignment of circular apertures spaced along said wide section of said fence plate adjacent said guide fence with said circular apertures used for marking drill holes in said guide base, said holes when drilled aligning with an alignment of slots cut tranversely centrally in said wide section of said fence plate when said fence plate is repositioned with said top surface upward and said edge alignment guide in alignment with said edge of said guide base;
    means extending through said drilled holes for removably attaching said fence plate to said guide base;
    means for transverse position adjustment of said fence plate relative to said guide base.

2. The portable guide fence of claim 1, wherein said means for removably attaching said fence plate to said guide base includes thumbscrew bolts with thumbscrew knobs which can be screwed down onto said thumbscrew bolts and unscrewed completely therefrom with said thumbscrew bolts inserted upwardly through said drilled holes in said guide base and through said alignment of slots cut transversely centrally in said wide section of said fence plate.

3. The portable guide fence of claim 1, wherein said means for transverse position adjustment of said fence plate relative to said guide base includes readjusting the position of said removable attachment means in said alignment of slots cut transversely centrally in said wide section of said fence plate.

4. A portable guide fence for hand held power saws, comprising:
    a fence plate;
    said fence plate being an elongated substantially rectangular bar;
    said bar having a vertically disposed longitudinally surface along one edge of said bar formed with sufficient width to provide a guide fence for said hand held power saws and a second vertically disposed longitudinal surface along a second edge of said bar;
    said bar providing one-piece structuring of said fence plate, there being a wide section having a top surface and a bottom surface;
    said fence plate invertible as a template with said top surface downward and said guide fence in alignment with an edge of a guide base to position an alignment of circular apertures spaced along said wide section of said fence plate adjacent said guide fence edge with said circular apertures used for marking drill holes in said guide base, said holes when drilled aligning with an alignment of slots cut transversely centrally in said wide section of said fence plate when said fence plate is repositioned with said top surface upward and said second vertically disposed longitudinal surface in alignment with said edge of said guide base;
    means extending through said drilled holes for removably attaching said fence plate to said guide base;
    means for transverse position adjustment of said fence plate relative to said guide base.

5. The portable guide fence of claim 4, wherein said means for removably attaching said fence plate to said guide base includes thumbscrew bolts with thumbscrew knobs which can be screwed down onto said thumbscrew bolts and unscrewed completely therefrom.

6. The portable guide fence of claim 4, wherein said means for transverse position adjustment of said fence plate relative to said guide base includes readjusting the position to said removable attachment means in said alignment of slots cut transversely centrally in said wide section of said fence plate.

* * * * *